(12) United States Patent
O'Meachair

(10) Patent No.: US 9,416,834 B2
(45) Date of Patent: Aug. 16, 2016

(54) BRAKING SYSTEM FOR A VEHICLE

(71) Applicant: Bentley Motors Limited, Crewe Cheshire (GB)

(72) Inventor: Deaglan O'Meachair, Cheshire (GB)

(73) Assignee: BENTLEY MOTORS LIMITED (GB)

(*) Notice: Subject to any disclaimer, the term of this patent is extended or adjusted under 35 U.S.C. 154(b) by 0 days.

(21) Appl. No.: 14/381,396

(22) PCT Filed: Feb. 28, 2013

(86) PCT No.: PCT/GB2013/050497
§ 371 (c)(1),
(2) Date: Aug. 27, 2014

(87) PCT Pub. No.: WO2013/128192
PCT Pub. Date: Sep. 6, 2013

(65) Prior Publication Data
US 2015/0094926 A1    Apr. 2, 2015

(30) Foreign Application Priority Data
Feb. 29, 2012  (GB) .................................. 1203569.7

(51) Int. Cl.
*B60T 8/1755* (2006.01)
*F16D 65/78* (2006.01)
(Continued)

(52) U.S. Cl.
CPC ................. *F16D 65/78* (2013.01); *B60L 1/003* (2013.01); *B60L 7/26* (2013.01); *B60L 11/1861* (2013.01); *B60T 5/00* (2013.01); *B60T 13/585* (2013.01); *B60W 10/188* (2013.01); *B60W 10/30* (2013.01);
(Continued)

(58) Field of Classification Search
USPC .......... 701/22, 33.4, 70; 303/3, 6.01, 11, 152; 280/676; 180/54.1, 65.51, 65.265, 180/65.275; 188/1.11 L, 156; 62/241; 363/50; 74/665 A
See application file for complete search history.

(56) References Cited

U.S. PATENT DOCUMENTS

2001/0027368 A1* 10/2001 Minowa ............ B60W 30/1819
                                                         701/70
2006/0053814 A1*  3/2006 Naik ..................... B60H 1/3208
                                                           62/241
(Continued)

FOREIGN PATENT DOCUMENTS

JP      H06113404 A     4/1994
JP      S63266229 A    11/1998
(Continued)

*Primary Examiner* — James Trammell
*Assistant Examiner* — Sanjeev Malhotra
(74) *Attorney, Agent, or Firm* — Barlow, Josephs & Holmes, Ltd.

(57) ABSTRACT

A braking system for a vehicle includes a regenerative braking system and a friction braking system. The friction braking system includes one or more conventional friction brakes, and a cooling device operable to cool the one or more friction brakes. The regenerative braking system includes an electric motor that is configurable to operate as an electric generator. The electric motor is connected to the vehicle's road wheels and is operable to decelerate the vehicle by using the wheels to drive electric motor to generate electric energy. The regenerative braking system is operable to direct at least part of the recovered energy to the cooling device and/or the battery. The regenerative braking system preferentially directs the recovered energy to battery. When the battery is at substantially full capacity, the regenerative braking system directs the recovered energy to the cooling device.

11 Claims, 3 Drawing Sheets

Figure 1:
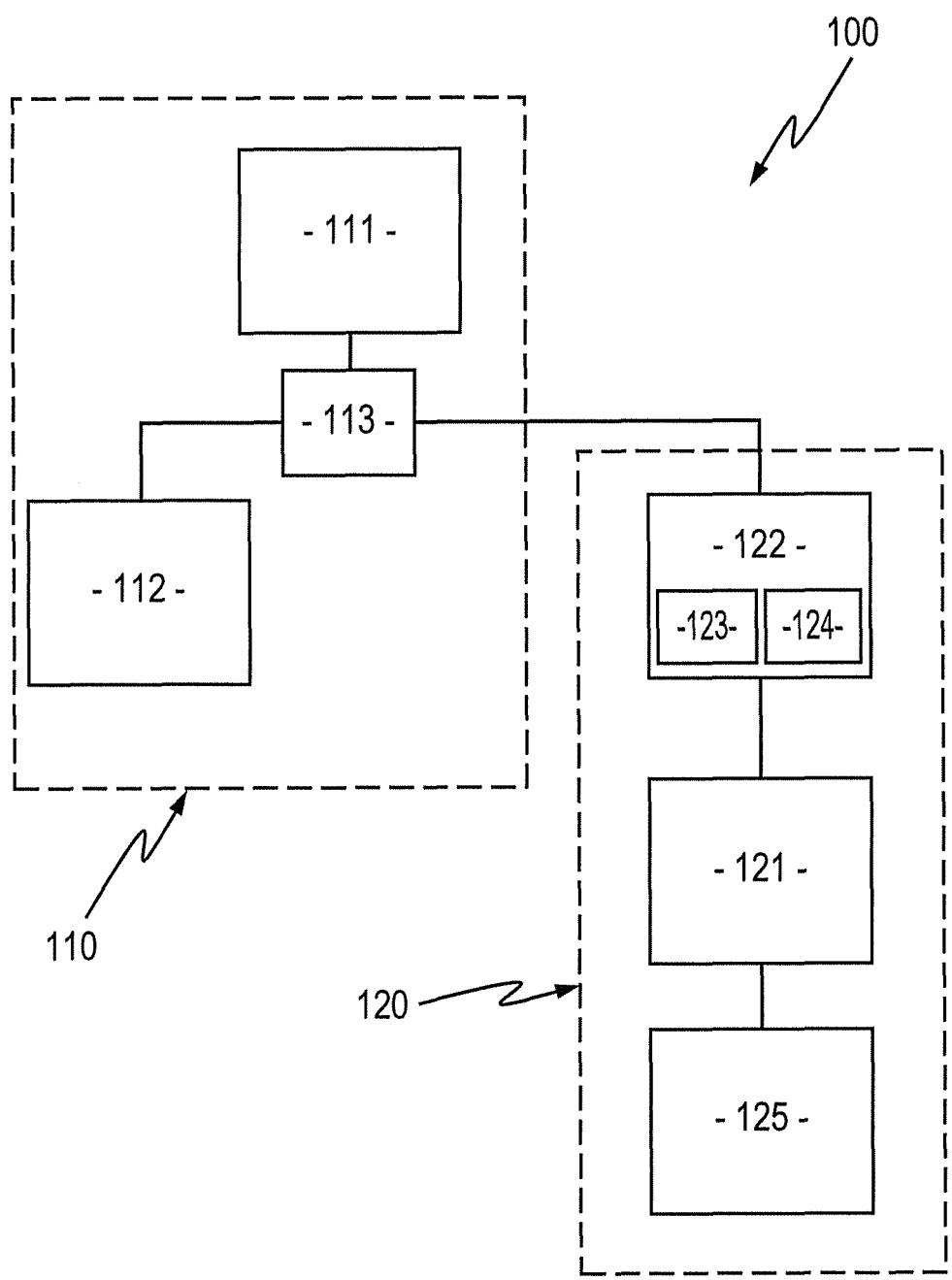

(51) Int. Cl.
  *B60T 5/00*      (2006.01)
  *B60T 13/58*     (2006.01)
  *B60W 30/18*     (2012.01)
  *B60L 1/00*      (2006.01)
  *B60L 7/26*      (2006.01)
  *B60L 11/18*     (2006.01)
  *B60W 10/188*    (2012.01)
  *B60W 10/30*     (2006.01)
  *F16D 65/847*    (2006.01)

(52) U.S. Cl.
  CPC ....... *B60W 30/18127* (2013.01); *F16D 65/847* (2013.01); *B60L 2240/36* (2013.01); *B60W 2510/184* (2013.01); *B60W 2710/305* (2013.01); *F16D 2065/783* (2013.01); *Y02T 10/705* (2013.01); *Y02T 10/7005* (2013.01); *Y02T 10/7044* (2013.01); *Y02T 10/92* (2013.01)

(56) References Cited

U.S. PATENT DOCUMENTS

| | | | |
|---|---|---|---|
| 2007/0084682 A1* | 4/2007 | Griffith | B60T 8/00 188/156 |
| 2007/0169970 A1* | 7/2007 | Kydd | B60K 6/48 180/65.275 |
| 2007/0223259 A1* | 9/2007 | Nozaki | B60K 6/485 363/50 |
| 2008/0110683 A1* | 5/2008 | Serkh | B60K 25/00 180/54.1 |
| 2009/0101425 A1* | 4/2009 | Laurent | B60G 3/01 180/65.51 |
| 2009/0218179 A1* | 9/2009 | Yokoyama | B60T 13/741 188/1.11 L |
| 2010/0187901 A1* | 7/2010 | Sonoda | B60L 7/10 303/11 |
| 2011/0127828 A1* | 6/2011 | Sorin | B60T 1/10 303/3 |
| 2011/0198141 A1* | 8/2011 | Clark | B60K 6/48 180/65.265 |
| 2011/0203409 A1* | 8/2011 | Nishida | B60W 10/30 74/665 A |
| 2011/0224868 A1* | 9/2011 | Collings, III | B60L 11/1857 701/33.4 |
| 2011/0233994 A1* | 9/2011 | Harding | B60T 1/10 303/152 |
| 2011/0285200 A1* | 11/2011 | Hatano | B60L 7/24 303/6.01 |
| 2011/0307130 A1* | 12/2011 | Gow | B60G 17/0195 701/22 |
| 2012/0018984 A1* | 1/2012 | Oriet | B60G 5/02 280/676 |
| 2013/0211683 A1* | 8/2013 | Philpott | B60T 17/221 701/70 |

FOREIGN PATENT DOCUMENTS

| | | |
|---|---|---|
| WO | 2005038283 A1 | 4/2005 |
| WO | 2010019784 A2 | 2/2010 |

\* cited by examiner

BRAKING SYSTEM FOR A VEHICLE

TECHNICAL FIELD OF THE INVENTION

The present invention relates to a braking system for a vehicle that incorporates an element of regenerative braking, and to a vehicle fitted with such a braking system.

BACKGROUND TO THE INVENTION

Regenerative braking systems capture, and possibly store for future use, at least part of the kinetic energy lost by a vehicle as it brakes. Such systems are often employed by electric and hybrid vehicles. When a regenerative brake is applied, an electric drive motor of the vehicle acts as a generator and converts the vehicle's kinetic energy into electrical energy, which is used to charge the battery. However, when the battery is at full capacity, such a system cannot be used and therefore vehicles with regenerative braking systems are also provided with conventional friction brakes.

Hybrid vehicles tend to be significantly heavier than other vehicles since they comprise a greater number of component parts. As such, they tend to have correspondingly larger friction brakes to ensure that the friction brakes can stop the vehicle sufficiently quickly. In turn, this further increases the mass of such vehicles relative to conventional vehicles. However, it is generally desired to reduce the mass of vehicles, particularly their un-sprung mass.

JP6113404 discloses an arrangement where energy recovered by a regenerative braking system is used to drive brake cooling fans for friction brakes. This enables regenerative braking to be employed even when the vehicle battery is fully charged and, by cooling the friction brakes, improves their fade resistance. Power generated during regenerative braking is apportioned between the vehicle battery and brake cooling fans depending on the state of charge of the battery. So, when the battery is not fully charged a greater proportion of the recovered energy is directed to the battery. When the battery is fully, or nearly fully, charged a greater proportion of the energy is directed to the cooling fans. This provides a crude measure of control in that greater brake cooling is afforded when the battery is fully charged when regenerative braking is limited and so greater reliance is placed on the friction brakes causing them to generate more heat which must be dissipated.

However, this arrangement still causes unnecessary operation of the brake cooling fans leading to wasted energy and/or inefficient operation of the mechanical brakes.

It is an object of embodiments of the present invention to at least partially overcome these problems.

SUMMARY OF THE INVENTION

According to a first aspect of the present invention there is provided: a braking system for a vehicle comprising: a regenerative braking system operable to recover energy when braking the vehicle, a friction braking system comprising one or more friction brakes and a cooling device operable to cool the one or more friction brakes, a control device operable to direct at least part of the recovered energy to drive the cooling device and characterised by a temperature sensor arranged to measure the temperature of at least one friction brake and relay the measured temperature to the control device, and in that the control device is arranged to direct energy to the cooling device in dependence upon the measured temperature of the or each friction brake.

By measuring the temperature of the or each friction brake it is possible to arrange to operate the cooling device only when the brakes require cooling. This gives the combined benefits of saving energy and ensuring that the brakes reach a desirable minimum operating temperature so as to optimise their performance.

The regenerative braking system may comprise an energy storage device. The energy storage device may be operable to store electrical or electrochemical energy. The energy storage device may comprise a battery and/or a capacitor. The control device may be operable to direct at least part of the recovered energy to the energy storage device.

The control device may direct the recovered energy directly to the cooling device. Alternatively, the recovered energy may be directed to the cooling device via one or more intermediate components. For example, the recovered energy may be directed to the energy storage device and, subsequently, directed from the energy storage device to the cooling device.

The control device may be operable to establish availability capacity in the storage device. When the energy storage device is at substantially full capacity, the control device may be operative to direct all of the recovered energy to the cooling device. This allows the regenerative braking system to continue to operate even when the energy storage device is substantially full.

The control device may be operative to direct at least part of the recovered energy to the cooling device when the friction brakes are in use. This may help to better dissipate heat generated by the friction brakes and keep the friction brakes at a relatively low temperature. The control device may be further operable to direct at least part of the recovered energy to the cooling device for a finite time after the friction brakes have been in use, and/or until the friction brakes have reached a desired temperature.

The cooling device may comprise a blower and a means for directing air produced by said blower towards the one or more friction brakes. Each of the one or more friction brakes may be provided with its own blower. Alternatively, the braking system may comprise a blower that is operable to serve a plurality of the friction brakes, said blower being provided with a means for directing air towards each of the friction brakes served thereby. Said blower may act as an air source for other components of the vehicle. For example, the blower may also serve to cool an engine of the vehicle.

The control device may comprise a processor. The control device may be operable to control any or all of the following: actuation of the regenerative braking system; actuation of the friction braking system; actuation of the cooling device; and the destination to which the recovered energy is directed from the regenerative braking system.

According to a second aspect of the present invention there is provided: a vehicle comprising a braking system according to the first aspect of the present invention.

The vehicle according to the second aspect of the present invention may comprise any or all of the features of the braking system according to the first aspect of the present invention as desired or required.

The vehicle may be a hybrid vehicle having an internal combustion engine, and electric drive motor and an energy storage device. The vehicle may be an automobile.

DETAILED DESCRIPTION OF THE INVENTION

Figure 2:
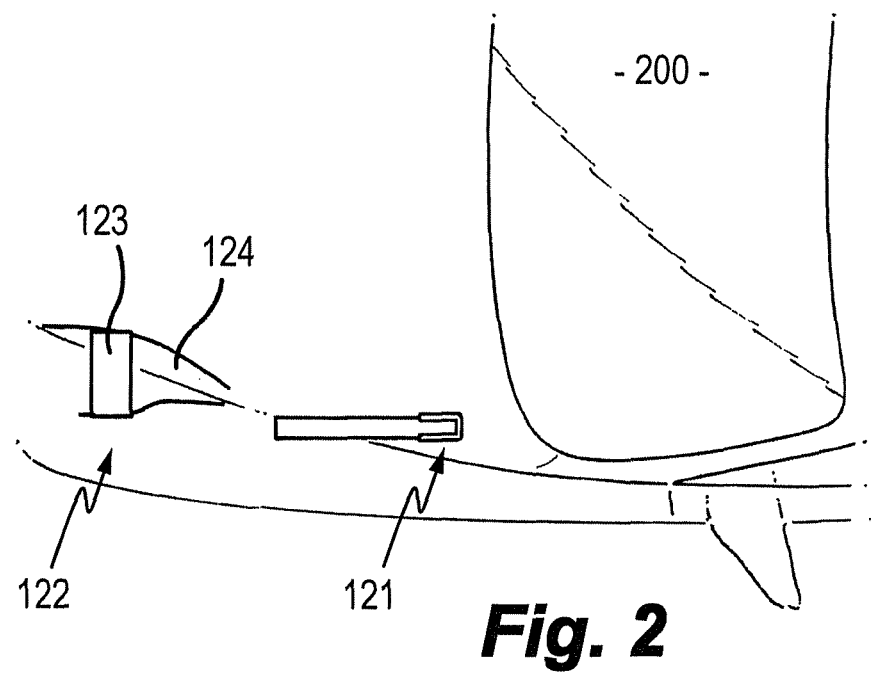
Figure 3:
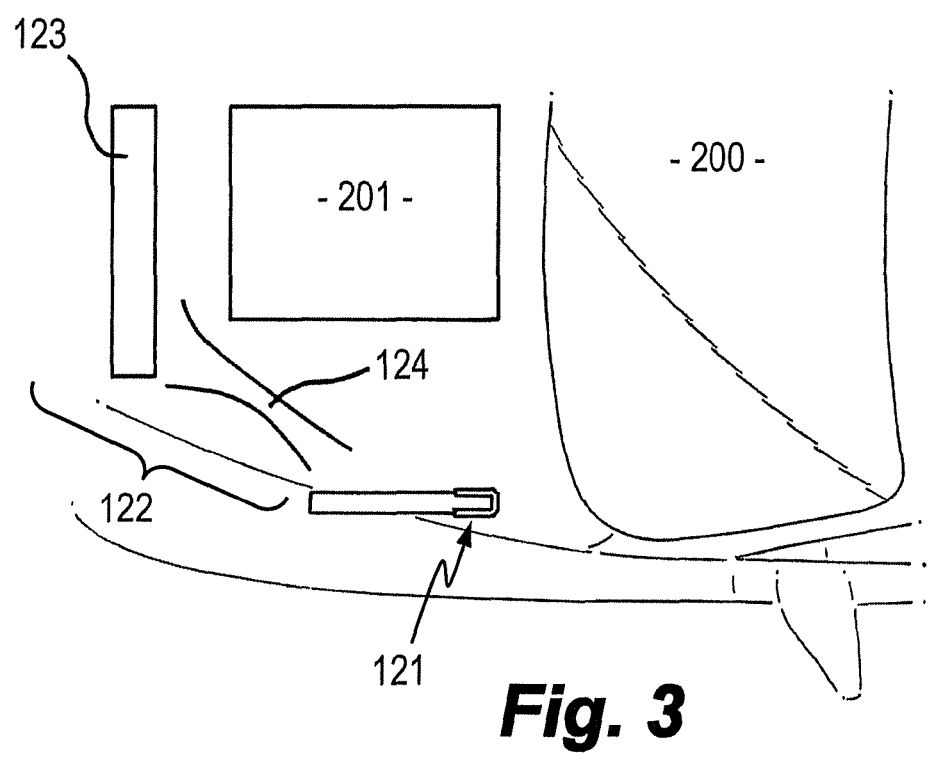
Figure 4:
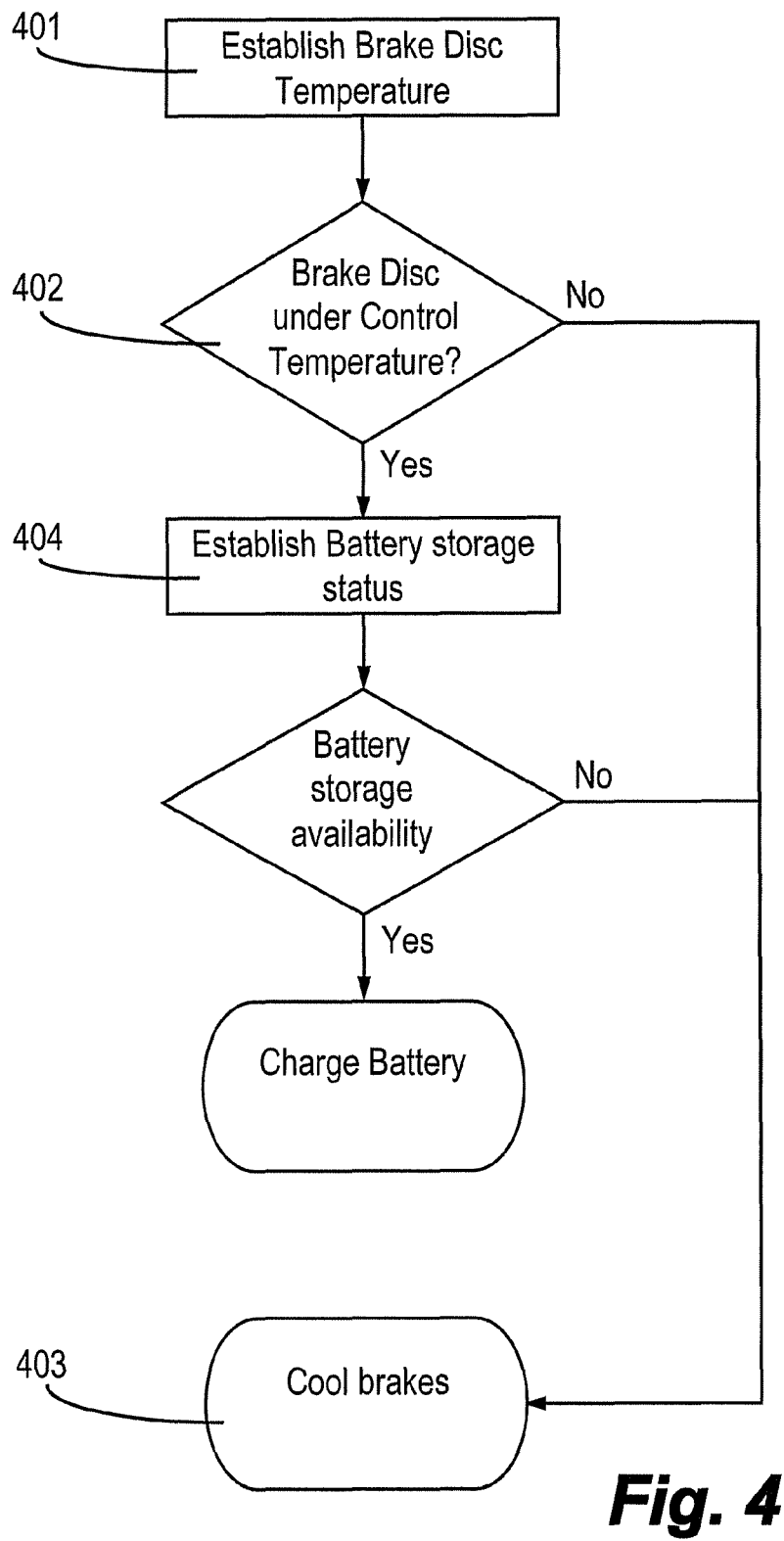

In order that the invention may be more clearly understood embodiments thereof will now be described, by way of example only, with reference to the accompanying drawings, of which:

FIG. 1 is a schematic view of a braking system;
FIG. 2 shows part of a vehicle with a first embodiment of a brake cooling device;
FIG. 3 shows part of a vehicle with a second embodiment of a brake cooling device; and FIG. 4 is a schematic diagram of a preferred operation mode of a braking system.

Referring to FIG. 1, a braking system 100 for a hybrid automobile comprises: a regenerative braking system 110 and a friction braking system 120.

The friction braking system 120 comprises: one or more traditional friction disc brakes 121; a cooling device 122; and temperature sensor 125.

The one or more traditional friction brakes 121 are operable to decelerate the vehicle in a conventional manner. Each such friction brake 121 comprises a brake disc disposed on an axle of the vehicle and one or more brake pads disposed on a chassis of the vehicle. When the friction brakes 121 are actuated, the brake pads are brought into contact with the brake disc and friction therebetween causes the rotation of the wheels relative to the chassis to slow down. This friction creates heat and therefore causes the brake pads and discs to heat up. The force which brings the brake pads and discs into contact may be provided by any standard method and may be, for example, mechanical, hydraulic, pneumatic or electromagnetic.

The cooling device 122 is operable to cool the one or more friction brakes 121. The cooling device 122 comprises one or more blowers 123, such as electric motor driven fans, and a means, such as a duct, 124 for directing air produced by said blowers 123 towards the friction brakes 121.

Various different specific embodiments of cooling device 122 are envisaged and two such embodiments will now be described with reference to FIGS. 2 and 3, which both show a part of an automobile 200. In the embodiment shown in FIG. 2, each friction brake 121 is provided with its own blower 123 and ducting 124 to direct air produced by said blower 123 towards said friction brake (only one friction brake is shown for simplicity). Alternatively, the friction braking system 120 may comprise a blower 123 that serves a plurality of friction brakes 121 and ducting 124 is provided to direct air produced by the blower 123 towards each friction brake 121. This is the case for the embodiment shown in FIG. 3, wherein a single blower 123 serves as the air source 123 for both of the front friction brakes 121 (only one friction brake is shown for simplicity). The single blower 123 is situated centrally, towards the front of the vehicle 200 and is also operable to cool an engine 201 of the vehicle 200.

The temperature sensor 125 is operable to determine the temperature of the one or more friction brakes 121.

The regenerative braking system 110 comprises an electric drive motor 111 that is configurable to operate as an electric generator. The electric motor 111 is connected to one or more of the vehicle's road wheels and is operable to decelerate the vehicle by using one or more of said wheels to drive electric motor 111 to generate electric energy. By doing this, the regenerative braking system 101 is operable to recover energy when braking the vehicle. The system further comprises an electric battery 112 and a control device 113.

The control device 113 comprises a processor. It is connected to the electric motor, battery, friction brake temperature sensor(s) 125 and driver's brake control (such as a brake pedal). It is operable to control: actuation of the regenerative braking system 110; actuation of the friction braking system 120; actuation of the cooling device 122; and the destination to which the recovered energy is directed from the regenerative braking system 110.

In use, when the braking system 100 is actuated to slow the vehicle, the regenerative braking system 110 and/or the friction braking system 120 may be used. The friction brake cooling device may be operated at any time, and driven by energy recovered by the regenerative braking system and/or stored in the battery 112.

The control device 113 operates to ensure that, where possible, the regenerative braking system is used in preference to the friction braking system, that as much as possible of the energy recovered by the regenerative braking system is stored in the battery and that the friction brakes are maintained within a desired operating temperature range.

A preferred operation 400 mode of a braking system 100 is illustrated in FIG. 4.

On a brake application, as a first step 401, the control device determines the temperature of the friction brakes using the temperature sensor 125. At the next step 402 the temperature of the brake disc of each of the friction brakes 121 is compared to a threshold Control Temperature.

If the temperature of any brake disc exceeds the threshold Control Temperature then the cooling device 122 is actuated to cool the brake discs (step 403) and any energy recovered by the regenerative braking system 110 is directed to drive the cooling device 122. Any excess energy may be directed to charge the battery.

If the temperature of each of the bake discs is lower than the threshold Control Temperature then, as a next step 404, it is determined whether or not the battery 112 is at full capacity. If the battery 112 is at full capacity and there is no storage available then all of the energy recovered by the regenerative braking system 110 is directed to the cooling device 122 and the cooling device 122 is actuated to cool said bake discs (step 403). Otherwise, all of the energy recovered by the regenerative braking system 110 is directed to the battery 112.

The sequence of steps may be continually reviewed during a brake application so that operation of the system may change for example as the friction brakes heat up and/or the battery becomes fully charged.

When the friction braking system 120 is utilised and its temperature is above the Control Temperature, the cooling device 122 is actuated and directs air at the friction brakes 121. This aids the dissipation of the heat that is generated by the friction brakes 121 and therefore allows the friction braking system 120 to function more efficiently. The control device may cause the cooling device 122 to run finite time after the friction braking system 120 has been used and/or until the temperature of the brakes falls below the Control Temperature, or some higher threshold temperature. It is desirable to minimise operation of the cooling device when the regenerative braking system is not operating so as not to use up energy stored in the battery.

The combination of a cooling device 122 to cool the friction brakes 121, and the functionality to redirect energy recovered by the regenerative braking system 110 to the cooling device allows one to reduce the size and weight of the friction brakes 121 on an electric or hybrid motor vehicle. This is especially advantageous for hybrid vehicles which are generally significantly heavier than conventional vehicles.

Controlling operation of the brake cooling device depending upon the temperature of the friction brakes enables the friction brakes to be maintained within a desired operating temperature range to maximise their efficiency whilst also allowing as much recovered energy as possible to be stored in the battery.

The above embodiments are described by way of example only. Many variations are possible without departing from the scope of the invention as defined in the appended claims.

The invention claimed is:

1. A braking system for a vehicle comprising:
   an electric regenerative braking system comprising an electric motor operable to convert kinetic energy to electric energy when braking the vehicle, and further comprising an electric energy storage device;
   a friction braking system comprising a friction brake and a cooling device operable to cool said friction brake, said cooling device comprising an electric blower that directs air towards said friction brake;
   a temperature sensor arranged to measure the temperature of said friction brake; and
   a control device operable to monitor a storage capacity of said electric energy storage device and said temperature of said friction brake and to selectively direct at least part of the converted electric energy to drive the cooling device and at least part of the converted electric energy to said electric energy storage device in dependence upon the measured temperature of said friction brake and in dependence upon the storage capacity of said electric energy storage device.

2. The braking system as claimed in claim 1 wherein the control device is operative to direct all of the converted electric energy to the electric blower when the electric energy storage device is at substantially full capacity.

3. The braking system as claimed in claim 2 wherein the control device is arranged to direct all of the converted electric energy to the electric energy storage device when the electric energy storage device is at less than full capacity and the measured temperature of the friction brake is below a threshold value.

4. The braking system as claimed in claim 1 wherein the control device is operative to direct at least part of the converted electric energy to the electric blower when the measured temperature of the friction brake exceeds a threshold value.

5. The braking system as claimed in claim 1 wherein the control device is operative to direct at least part of the converted electric energy to the electric blower when the friction brake is in use.

6. The braking system as claimed in claim 5 wherein the control device is operative to direct at least part of the converted electric energy to the electric blower for a finite time after the friction brake is in use.

7. The braking system as claimed in claim 5 wherein the control device is operative to continue running the electric blower when the friction brake is no longer in use if the measured temperature of the friction brake exceeds a threshold value.

8. The braking system as claimed in claim 1, further comprising a plurality of friction brakes, wherein each of the friction brakes is provided with a respective electric blower for directing air towards the respective friction brake.

9. The braking system as claimed in claim 1, further comprising a plurality of friction brakes, wherein the electric blower is operable to serve said plurality of friction brakes, said electric blower being provided with a means for directing air towards each of the plurality of friction brakes served thereby.

10. The braking system as claimed in claim 9 wherein the electric blower also acts as an air source for other components of the vehicle.

11. The braking system as claimed in claim 1 wherein the control device is operable to control any or all of the following: actuation of the electric regenerative braking system; actuation of the friction braking system; actuation of the cooling device; and the destination to which the converted electric energy is directed from the electric regenerative braking system.

* * * * *